(12) United States Patent
Jeong et al.

(10) Patent No.: US 11,678,047 B2
(45) Date of Patent: Jun. 13, 2023

(54) ELECTRONIC DEVICE AND METHOD PROVIDING CONTENT ASSOCIATED WITH IMAGE TO APPLICATION

(71) Applicant: Samsung Electronics Co., Ltd., Suwon-si (KR)

(72) Inventors: Seunghwan Jeong, Suwon-si (KR); Jaeyong Yang, Suwon-si (KR); Gyuhyun Kim, Suwon-si (KR); Ilsup Kim, Suwon-si (KR); Dasom Lee, Suwon-si (KR); Changsun Lee, Suwon-si (KR); Saemee Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 16/795,361

(22) Filed: Feb. 19, 2020

(65) Prior Publication Data

US 2020/0267327 A1    Aug. 20, 2020

(30) Foreign Application Priority Data

Feb. 19, 2019 (KR) .................. 10-2019-0019178

(51) Int. Cl.
G06V 20/10    (2022.01)
H04N 23/63    (2023.01)
G06V 40/16    (2022.01)

(52) U.S. Cl.
CPC .......... H04N 23/632 (2023.01); G06V 20/10 (2022.01); G06V 40/161 (2022.01)

(58) Field of Classification Search
CPC . H04N 5/232935; G06V 40/161; G06V 20/10
See application file for complete search history.

(56) References Cited

U.S. PATENT DOCUMENTS 9,674,448 B2    6/2017   Kim et al.
2012/0315884 A1  12/2012  Forutanpour et al.
(Continued)

FOREIGN PATENT DOCUMENTS

EP    2787722 A1    10/2014
EP    2980758 A2    2/2016
(Continued)

OTHER PUBLICATIONS

International Search Report and Written Opinion of the International Searching Authority in connection with International Application No. PCT/KR2020/002373 dated Jun. 11, 2020, 8 pages.
(Continued)

*Primary Examiner* — Twyler L Haskins
*Assistant Examiner* — Fayez A Bhuiyan

(57) ABSTRACT

An electronic device according to various embodiments includes a camera, a memory, a display, and a processor. The processor is configured to: based on an input for executing a camera application being received, identify first images shot within a region of a set range from a location of the electronic device from among a plurality of images, based on location information of the plurality of images stored in the memory or an external electronic device; select at least one second image from the first images, based on a priority of each of the first images; and, while displaying a preview image obtained through the camera on the display, display a visual object including a thumbnail image corresponding to the at least one second image on the display by overlaying the visual object on the preview image.

20 Claims, 9 Drawing Sheets

(56) References Cited

U.S. PATENT DOCUMENTS

| | | | |
|---|---|---|---|
| 2013/0328926 A1 | 12/2013 | Kim et al. | |
| 2015/0172560 A1 | 6/2015 | Baek | |
| 2016/0286132 A1 | 9/2016 | Kim et al. | |
| 2017/0235445 A1 | 8/2017 | Kim et al. | |
| 2018/0137119 A1* | 5/2018 | Li | G06F 16/5866 |
| 2018/0181568 A1* | 6/2018 | Leong | G06F 16/40 |

FOREIGN PATENT DOCUMENTS

| | | |
|---|---|---|
| EP | 2993890 A1 | 3/2016 |
| EP | 3016005 A1 | 5/2016 |
| JP | 2010098536 A | 4/2010 |
| JP | 2017-041019 A | 2/2017 |
| KR | 10-2012-0014794 A | 2/2012 |
| KR | 101303166 B1 | 9/2013 |
| KR | 10-2015-0111552 A | 10/2015 |
| KR | 10-2018-0058461 A | 6/2018 |

OTHER PUBLICATIONS

Supplementary European Search Report dated Feb. 14, 2022, in connection with European Application No. 20759941.6, 9 pages.
Communication pursuant to Article 94(3) EPC dated Apr. 20, 2023, in connection with European Application No. 20759941.6, 5 pages.

* cited by examiner

ELECTRONIC DEVICE AND METHOD PROVIDING CONTENT ASSOCIATED WITH IMAGE TO APPLICATION

CROSS-REFERENCE TO RELATED APPLICATION

This application is based on and claims priority under 35 U.S.C. § 119 to Korean Patent Application No. 10-2019-0019178, filed on Feb. 19, 2019, in the Korean Intellectual Property Office, the disclosure of which is herein incorporated by reference in its entirety.

BACKGROUND

1. Field

Various embodiments of the disclosure relate to an electronic device which provides a content associated with an image to an application, and a method thereof.

2. Description of Related Art

An electronic device may provide an augmented reality (AR) service by overlaying information related to a preview image on the preview image, while displaying the preview image obtained through a camera. Such an electronic device may provide the AR service by overlaying coupon information, product information, object information, place information, food information associated with the preview image, or a combination thereof on the preview image.

The above information is presented as background information only to assist with an understanding of the disclosure. No determination has been made, and no assertion is made, as to whether any of the above might be applicable as prior art with regard to the disclosure.

SUMMARY

When an electronic device provides an AR service within a dedicated application (for example, Bixby vision) or a specific application, the electronic device may display information according to the AR service on a screen of a display. When there are large amounts of information associated with a preview image, the electronic device may display information that is not desired by a user on the display. Accordingly, the user may feel inconvenience in using the AR service of the electronic device. Therefore, there may be a need for a solution to select information desired by a user and to overlay the information on a preview image in an electronic device.

The technical objects to be achieved by the disclosure are not limited to those mentioned above, and other technical objects that are not mentioned above may be clearly understood to those skilled in the art based on the description provided below.

An electronic device according to various embodiments may include a camera, a memory, a display, and a processor, and the processor may be configured to: when an input for executing a camera application is received, identify first images which are shot within a region of a set range from a location of the electronic device from among a plurality of images, based on location information of the plurality of images stored in the memory or an external electronic device; select at least one second image from the first images, based on a priority of each of the first images; and, while displaying a preview image obtained through the camera on the display, display a visual object including a thumbnail image corresponding to the at least one second image on the display by overlaying the visual object on the preview image.

An operating method of an electronic device according to various embodiments may include: when an input for executing a camera application is received, identifying first images which are shot within a region of a set range from a location of the electronic device from among a plurality of images, based on location information of the plurality of images stored in a memory of the electronic device or an external electronic device; selecting at least one second image from the first images, based on a priority of each of the first images; and, while displaying a preview image obtained through a camera of the electronic device on a display of the electronic device, displaying a visual object including a thumbnail image corresponding to the at least one second image on the display by overlaying the visual object on the preview image.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
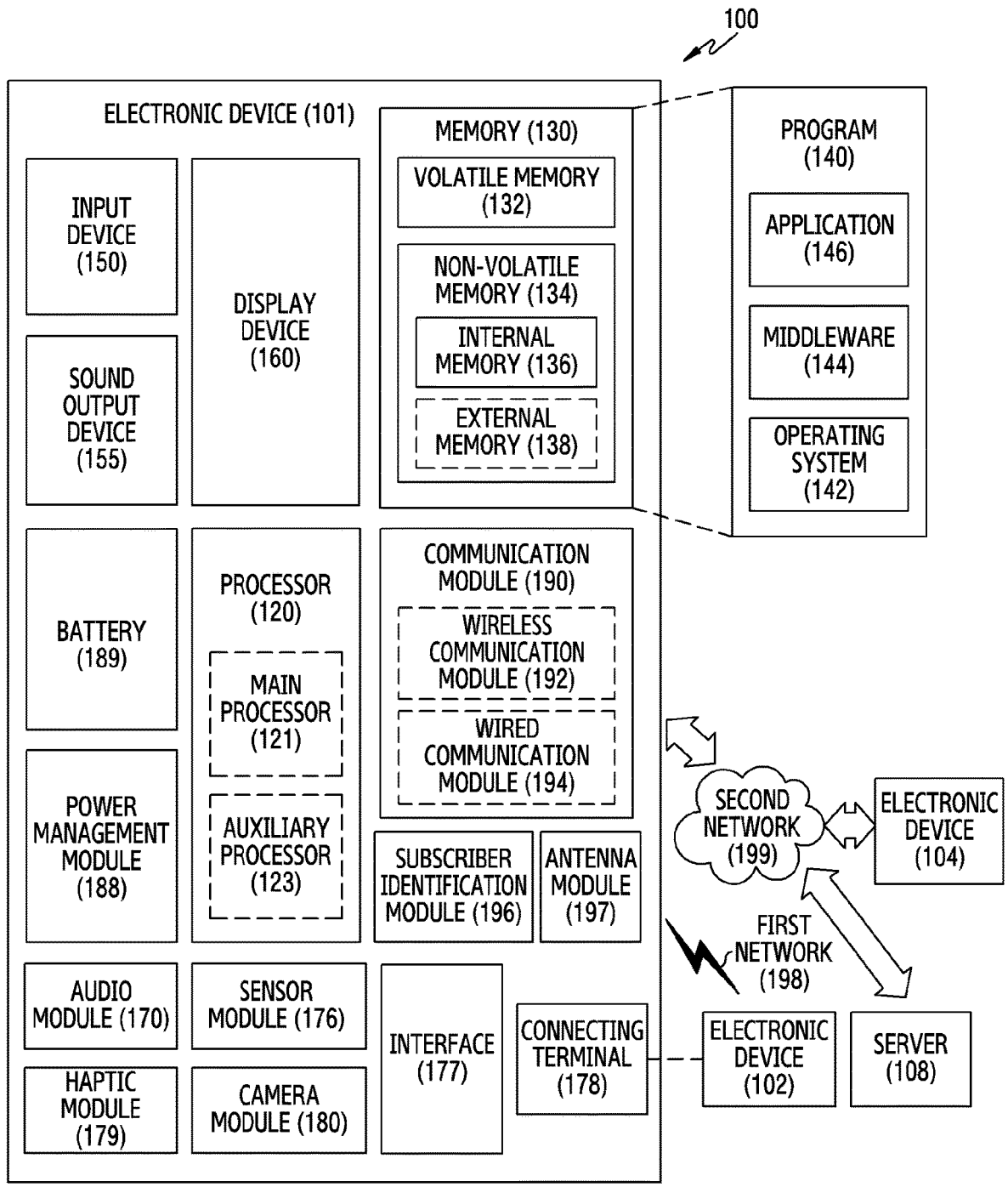
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
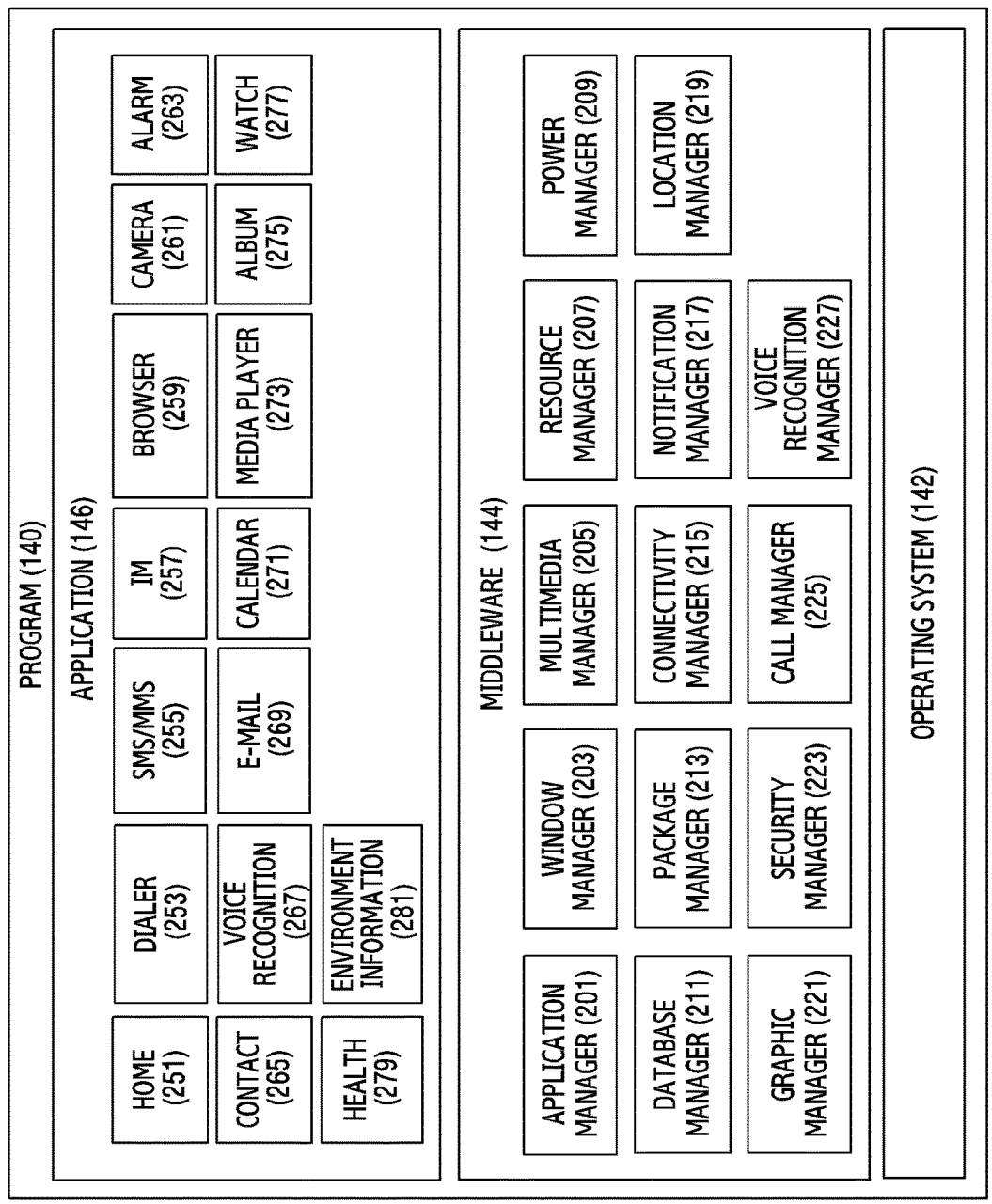
FIG. 2 is a block diagram illustrating a program of an electronic device according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
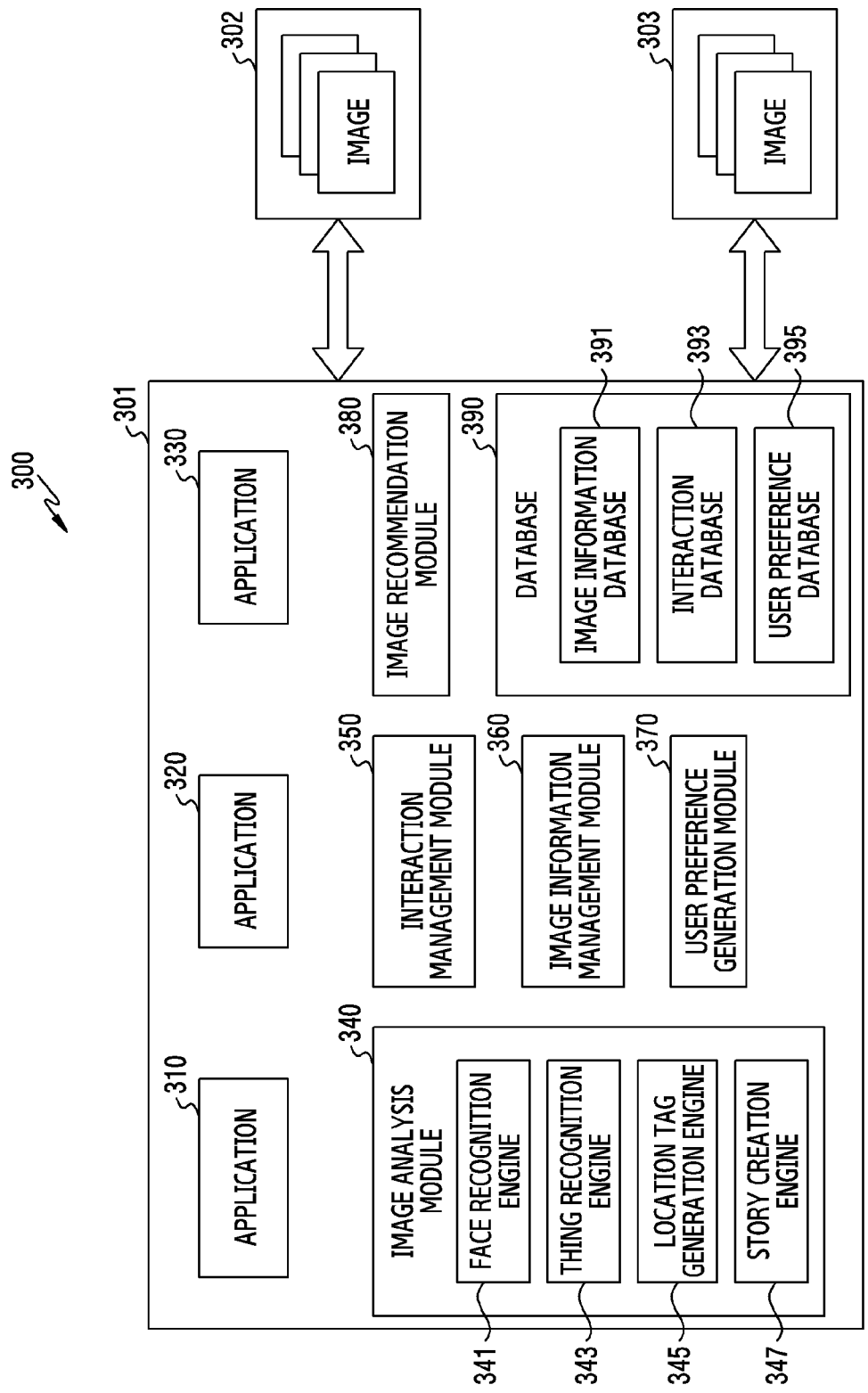
FIG. 3 is a view illustrating an example of a functional configuration of an electronic device according to various embodiments.

FIG. 3 is a view illustrating an example of a functional configuration 300 of an electronic device (for example, the electronic device 101 of FIG. 1) according to various embodiments. The functional configuration of FIG. 3 will be described with reference to the configuration of the electronic device 101 of FIG. 1.

Referring to FIG. 3, in various embodiments, a program 301 may include a plurality of applications 310, 320 or 330, an image analysis module 340, an interaction management module 350, an image information management module 360, a user preference generation module 370, an image recommendation module 380, a database 390, or a combination thereof. In various embodiments, the database 390 may include an image information database 391, an interaction database 393, a user preference database 395, or a combination thereof. In various embodiments, the program 301 may correspond to the program 140 of FIG. 1 or FIG. 2. In various embodiments, the program 301 may be used by the processor 120.

In various embodiments, the plurality of applications 310, 320, or 330 may include an image shooting application, an image viewing application, an image search application, or a combination thereof. However, this is merely an example and types of the plurality of applications 310, 320, or 330 are not limited thereto.

In various embodiments, the plurality of applications 310, 320, or 330 may drive the camera module 180. In various embodiments, the plurality of applications 310, 320, or 330 may display a preview image obtained through the camera module 180 on a display device (for example, the display device 160 of FIG. 1). In various embodiments, the plurality of applications 310, 320, or 330 may display an object for shooting an image on the display device 160 along with the preview image. In various embodiments, the plurality of applications 310, 320, or 330 may store the currently displayed preview image in a memory 302, a server 303, or a combination thereof as a new image, based on an input on the object. In various embodiments, when the new image is stored, the plurality of applications 310, 320, or 330 may provide information regarding the newly stored image to the image information management module 360. In various embodiments, the information regarding the newly stored image may include an identifier (for example, a name), a creation date, a shooting place, a storage path of the newly stored image, or a combination thereof.

In various embodiments, the plurality of applications 310, 320, or 330 may display an image stored in the memory 302, the server 303, or a combination thereof on the display device 160. In various embodiments, the plurality of applications 310, 320, or 330 may display a thumbnail regarding the image on the display device 160 in the form of a list. In various embodiments, a user may view the image through the plurality of applications 310, 320, or 330. In various embodiments, the plurality of applications 310, 320, or 330 may tag an object included in the image. In various embodiments, the plurality of applications 310, 320, or 330 may tag the object included in the image based on a user input. In various embodiments, the plurality of applications 310, 320, or 330 may share (or transmit) the image with (or to) another electronic device (for example, the electronic device 102 of FIG. 1).

In various embodiments, when viewing, tagging, sharing of the image, or a combination thereof is identified, the plurality of applications 310, 320, or 330 may provide information generated regarding the image to the image information management module 360. In various embodiments, the information generated regarding the image may include the number of times of viewing the image, tag information, the number of times of sharing the image, sharer information, or a combination thereof.

In various embodiments, the image analysis module 340 may include a face recognition engine 341, a thing recognition engine 343, a location tag generation engine 345, a story creation engine 346, or a combination thereof.

In various embodiments, the image analysis module 340 may analyze an image stored in the memory 302, the server 303, or a combination thereof. In various embodiments, the image analysis module 340 may extract data by analyzing the image. In various embodiments, the image analysis module 340 may provide the data extracted by analyzing the image to the image information management module 360. In various embodiments, the data extracted through the image analysis module 340 may be included in image information. In various embodiments, the data extracted through the image analysis module 340 may include object recognition information, location information, story information, or a combination thereof. In various embodiments, the object recognition information may include person recognition information, thing recognition information, or a combination thereof. In various embodiments, the story information may be information indicating a category regarding an image. In various embodiments, the story information of an image may be set based on a similar image of the image (for example, an image shot at the same (or similar) date, an image shot in the same (or similar) location, an image including the same (or similar) person, or a combination thereof). In various embodiments, the story information of the image may be set to one piece of story information from among pre-set pieces of story information. In various embodiments, the story information of the image may be set to story information designated by the user.

In various embodiments, respective images shot at the same (or similar) date may have different pieces of time-based story information according to a shooting pattern of the user according to a shooting time interval between the images. In various embodiments, the images shot at the same date may have the same story information, based on a user's shooting pattern (for example, shooting in the same (or similar) location, shooting the same (or similar) person, or a combination thereof). In various embodiments, the images shot at the same date may have different story information based on a user's shooting pattern. In various embodiments, images shot at different dates may have the same story information (for example, "travel"), based on a user's shooting pattern (for example, shooting in the same (or similar) location, shooting the same (or similar) person, or a combination thereof).

In various embodiments, the face recognition engine 341 of the image analysis module 340 may extract person recognition information from the image. In various embodiments, the face recognition engine 341 may recognize an object indicating a person (for example, a person's face shape) from among objects included in the image. In various embodiments, the face recognition engine 341 may identify information of the person indicated by the recognized object. In various embodiments, the face recognition engine 341 may identify information of the person indicated by the recognized object, based on face tag information regarding images that is stored in the memory 302, the server 303, or a combination thereof. In various embodiments, when the information of the person indicated by the recognized object is not identified, the face recognition engine 341 may determine that the recognized object identifies information of an unknown person. In various embodiments, the face recognition engine 341 may provide the person recognition information to the image information management module 360.

In various embodiments, the thing recognition engine 343 of the image analysis module 340 may extract thing recognition information from the image. In various embodiments, the thing recognition engine 343 may recognize an object indicating a thing (for example, a building, an article, a text, or a combination thereof) from among objects included in the image. In various embodiments, the thing recognition engine 343 may identify information of the thing indicated by the recognized object. In various embodiments, the thing recognition engine 343 may identify information of the thing indicated by the recognized object through an image search application. In various embodiments, the thing recognition engine 343 may provide the thing recognition information to the image information management module 360.

In various embodiments, the location tag generation engine 345 of the image analysis module 340 may identify location information regarding a place (for example, an address, a geographical location, a point of interest (POI), or a combination thereof) where the electronic device (for example, the electronic device 101 of FIG. 1) is located while the image is being obtained, based on a shooting location (for example, GPS) of the image. In various embodiments, the location tag generation engine 345 may provide the location information to the image information management module 360.

In various embodiments, the story creation engine 346 of the image analysis module 340 may create story information of the image. In various embodiments, the story creation engine 346 may create the story information based on the person recognition information, the thing recognition information, the location information of the image, or a combination thereof. In various embodiments, the story information may include a story type, a story character, a story place, or a combination thereof.

In various embodiments, the story creation engine 346 may set a story type of the image to one story type from among a plurality of set story types. In various embodiments, the story creation engine 346 may set the story type of the image based on the corresponding image, and person recognition information, thing recognition information, location information of an image associated with the corresponding image, or a combination thereof. In various embodiments, the story creation engine 346 may set the story character of the image based on the person recognition information of the image. In various embodiments, the story creation engine 346 may set the story place of the image based on the location information of the image.

In various embodiments, the interaction management module 350 may collect information according to a user input. In various embodiments, the interaction management module 350 may collect information according to a user input on the plurality of applications 310, 320, or 330. In various embodiments, when the user inputs a user input for viewing an image in the image viewing application, the interaction management module 350 may collect information indicating that the corresponding image is viewed. In various embodiments, when the user inputs a user input for tagging an unknown object of the viewed image in the image viewing application, the interaction management module 350 may collect information indicating that the unknown object of the corresponding image is tagged. In various embodiments, when the user inputs a user input for sharing the viewed image in the image viewing application, the interaction management module 350 may collect information indicating that the corresponding image is shared. In various embodiments, when the user inputs a user input for registering (or unregistering) a specific location (or place) of a map in a map application, the interaction management module 350 may collect information indicating that the corresponding location (or place) is registered (or unregistered). In various embodiments, the unknown object may be an object to which no tag is attached.

In various embodiments, the interaction management module 350 may transmit the collected information to the user preference generation module 370. In various embodiments, the interaction management module 350 may provide the collected information to the image information management module 360. In various embodiments, the interaction management module 350 may provide the information indicating that the corresponding image is viewed, the information indicating that the unknown object of the corresponding image is tagged, the information indicating that the corresponding image is shared, or a combination thereof to the image information management module 360.

In various embodiments, the interaction management module 350 may refine the interaction database 393 of the database 390, based on the collected information. In various embodiments, the interaction management module 350 may refine a place wish list of the interaction database 393, based on the information indicating that the corresponding location (or place) is registered (unregistered).

In various embodiments, the image information management module 360 may refine the image information database 391 of the database 390, based on information (or data) received from the plurality of applications 310, 320, or 330 or at least one of other modules. In various embodiments, the image information management module 360 may manage information of the image in the image information database 391. In various embodiments, the information of the image in the image information database 391 may include media information, face tag information, place information, story information, or a combination thereof. In various embodiments, the media information may include a date, a viewing time, the number of times of viewing, the number of times of sharing, or a combination thereof. In various embodiments, the face tag information may include face recognition, a person tag, a user tag, a contact profile, or a combination thereof. In various embodiments, the place information may include a place tag. In various embodiments, the story information may include a story type, a story character, a story place, or a combination thereof.

In various embodiments, the image information management module 360 may extract data stored in the image information database 391, in response to a request of the plurality of applications 310, 320, or 330 or at least one of the other modules (for example, a database query), and may transmit the extracted data to the application or module which has requested the data.

In various embodiments, the user preference generation module 370 may estimate a user's preference for the image stored in the memory 302, the server 303, or a combination thereof. In various embodiments, the user preference generation module 370 may calculate a preference value for the image, and may estimate a user's preference based on the calculated preference value.

In various embodiments, the user preference generation module 370 may generate a graph indicating a relationship of data (for example, person information, thing information, location information, or a combination thereof), based on information which is collected by the interaction management module 350 according to a user input. In various embodiments, the user preference generation module 370 may refine the graph indicating the relationship of the data, based on information which is newly collected by the interaction management module 350 according to a user input.

In various embodiments, the graph may include a node and a branch. In various embodiments, the node may indicate an identifier of information included in the data (for example, an identifier of person information). In various embodiments, the branch may indicate a relationship between two nodes connected by the branch. In various embodiments, a value of the branch may indicate a strength of the relationship between the two nodes connected by the branch. In various embodiments, the value of the branch may correspond to the number of images in which identifiers of two nodes connected by the branch are simultaneously identified, from among the images stored in the memory 302, the server 303, or a combination thereof.

In various embodiments, the user preference generation module 370 may generate a graph indicating a relationship of person information, based on a face tag tagged to the image stored in the memory 302, the server 303, or a combination thereof. In various embodiments, the node of the graph indicating the relationship of the person information may indicate an identifier of the face tag. In various embodiments, a value of the branch of the graph indicating the relationship of the person information may correspond to the number of images in which face tags of two nodes connected by the branch are simultaneously identified, from among the images stored in the memory 302, the server 303, or a combination thereof.

In various embodiments, the user preference generation module 370 may estimate a user's preference for a certain image based on the generated graph. In various embodiments, the user preference generation module 370 may calculate a preference value for the certain image based on the generated graph, and may estimate a user's preference based on the calculated preference value.

In various embodiments, the user preference generation module 370 may identify a center node based on the generated graph. In various embodiments, the center node may be a node that has the highest sum of values of branches connected to the node from among the nodes of the graph. In various embodiments, the center node may be a node regarding an identifier indicating that a face tag indicates herself/himself.

In various embodiments, the user preference generation module 370 may estimate the user's preference for the certain image, based on path lengths from the center node to nodes regarding the certain image. In various embodiments, the user preference generation module 370 may estimate the user's preference for the certain image to be higher as an average (or sum) of the path lengths of the nodes of the certain image is smaller. In various embodiments, the user preference generation module 370 may calculate a preference value corresponding to the average (or sum) of the path lengths of the nodes of the certain image.

In various embodiments, the user preference generation module 370 may estimate the user's preference for the certain image, based on the information of the image managed by the image information management module 360 in the image information database 391. In various embodiments, the user preference generation module 370 may estimate the user's preference for the certain image, based on a viewing time, the number of times of viewing, the number of times of sharing, or a combination thereof. In various embodiments, the user preference generation module 370 may estimate the user's preference for the image to be higher as a value according to the viewing time, the number of times of viewing, the number of times of sharing, or a combination thereof is higher. In various embodiments, the user preference generation module 370 may calculate a preference value corresponding to the value according to the viewing time of the certain image, the number of times of viewing, the number of times of sharing, or a combination thereof.

In various embodiments, the user preference generation module 370 may estimate the user's preference for the certain image, based on place information of the image managed in the image information database 391 and the place wish list of the interaction database 393. In various embodiments, the user preference generation module 370 may estimate the user's preference according to whether place information of the certain image is included in the place wish list. In various embodiments, the user preference generation module 370 may estimate that a user's preference for an image the place information of which is included in the place wish list is higher than that for an image the place information of which is not included in the place wish list. In various embodiments, the user preference generation module 370 may calculate a preference value of the image the place information of which is included in the place wish list to be higher than a preference value of the image the place information of which is not included in the place wish list.

In various embodiments, the user preference generation module 370 may estimate the user's preference for the certain image, based on story information of the image managed in the image information database 391. In various embodiments, the user preference generation module 370 may identify the number of images set for each of the plurality of story types. In various embodiments, the user preference generation module 370 may estimate the user's preference for the certain image, based on a story type set for the certain image. In various embodiments, the user preference generation module 370 may calculate a preference value regarding the certain image, according to the number of images set to have the same story type as the story type set for the certain image.

In various embodiments, the user preference generation module 370 may store (or refine) the estimated user's preference in the user preference database 395 of the database 390.

In various embodiments, the image recommendation module 380 may select at least one image from among the images stored in the memory 302, the server 303, or a combination thereof, based on the user's preference. In various embodiments, the image recommendation module 380 may select at least one image in order of the user's preference from among the images stored in the memory 302, the server 303, or a combination thereof.

In various embodiments, when there are two or more user preferences, the image recommendation module 380 may select at least one image based on a weighted average of the two or more preferences. In various embodiments, a sum of weights applied to the two or more preferences may be greater than or equal to 1.

In various embodiments, the image recommendation module 380 may extract an image corresponding to a current location of the electronic device 101 from among the images stored in the memory 302, the server 303, or a combination thereof. In various embodiments, the image recommendation module 380 may extract an image corresponding to a location indicated by a preview image obtained by the camera module 180 in a current location of the electronic device 101, from among the images stored in the memory 302, the server 303, or a combination thereof. In various embodiments, the image recommendation module 380 may extract an image corresponding to a thing object included in the preview image from among the images stored in the memory 302, the server 303, or a combination thereof. In various embodiments, the image recommendation module 380 may select at least one image from among the extracted images, based on user's preferences for the extracted images.

Figure 4:
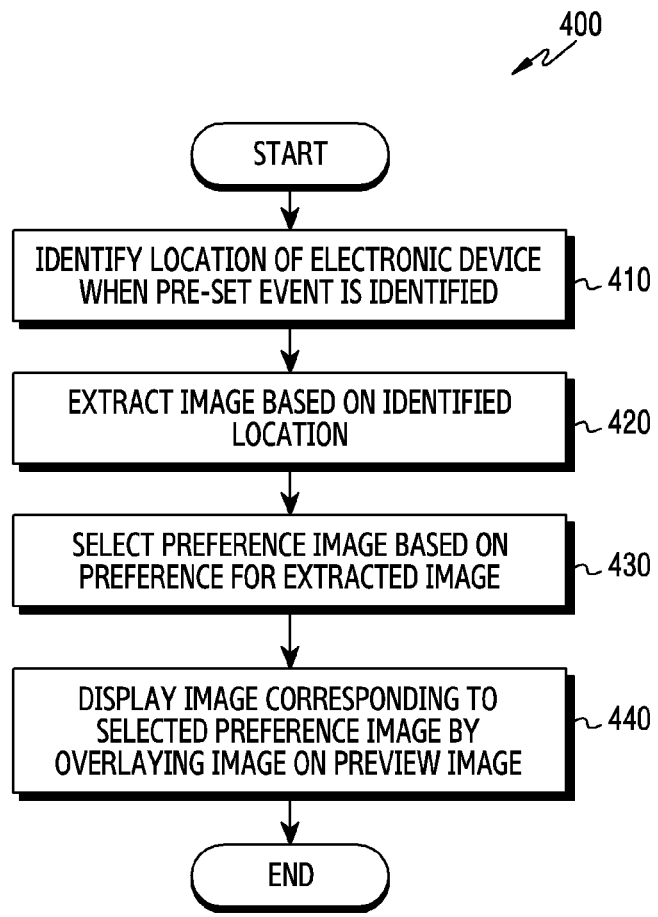
FIG. 4 illustrates a flowchart for overlaying a selected image on a preview image in an electronic device according to various embodiments.

FIG. 4 illustrates a flowchart 400 for overlaying an image selected by an electronic device (for example, the electronic device 101 of FIG. 1) according to various embodiments on a preview image. FIG. 4 will be described with reference to the functional configuration of FIG. 3 or the configuration of the electronic device 101 of FIG. 1.

Referring to FIG. 4, in various embodiments, in operation 401, a processor (for example, the processor 120 of FIG. 1) may identify a location of an electronic device (for example, the electronic device 101 of FIG. 1) when a pre-set event is identified. In various embodiments, the pre-set event may be an event in which an input for performing a pre-set function of an application is received. In various embodiments, the pre-set function may include a function for obtaining a preview image through a camera module (for example, the camera module 180 of FIG. 1), a function for providing an AR mode, or a combination thereof. However, this is merely an example and the pre-set function is not limited thereto. In various embodiments, the pre-set event may be an event in which an input for displaying an image stored in the memory 302, the server 303, or a combination thereof on the display device 160 is received.

In various embodiments, the processor 120 may identify a current location of the electronic device 101 through a GPS signal received through a communication module (for example, the communication module 190 of FIG. 1).

In various embodiments, in operation 420, the processor 120 may extract an image based on the identified location. In various embodiments, the processor 120 may extract an image a shooting location of which is within a set distance from the identified location, from among the images stored in the memory 302, the server 303, or a combination thereof. In various embodiments, the processor 120 may extract images corresponding to the current location of the electronic device 101 as shown in table 1 presented below:

TABLE 1

| File name | Date | Number of times of viewing | Number of times of sharing | Face tag | Story type | Place information |
|---|---|---|---|---|---|---|
| AA1.jpg | 2018 Dec. 24 | 124 | 3 | Mary, Eden | Baby | A mall |
| AA2.jpg | 2018 Dec. 24 | 250 | 2 | Eden | Baby | A mall |
| AA3.jpg | 2018 Dec. 24 | 134 | 3 | Mary | Baby | A mall |
| AA4.jpg | 2018 Dec. 24 | 128 | 2 | Mary, Eden | Baby | A mall |
| AA5.jpg | 2018 Dec. 24 | 100 | 2 | Eden | Baby | Address |
| BB1.jpg | 2018 Oct. 20 | 5 | 0 | Wife | — | B Lake |
| CC1.jpg | 2018 Oct. 19 | 0 | 0 | — | Location | B Lake |
| DD1.jpg | 2017 Dec. 20 | 0 | 0 | — | Location | B Lake |
| EE1.jpg | 2017 Aug. 1 | 25 | 0 | Lee Sin, me | Manual | C Restaurant |
| EE2.jpg | 2017 Aug. 1 | 35 | 0 | Lee Sin, me | Manual | C Restaurant |
| EE3.jpg | 2017 Aug. 1 | 45 | 1 | Lee Sin, me | Manual | C Restaurant |

Table 1 illustrates examples of images corresponding to the current location of the electronic device 101 that are extracted from among the images stored in the memory 302, the server 303, or a combination thereof. Table 1 illustrates examples of a list of extracted images and image information of the extracted images.

In various embodiments, in operation 430, the processor 120 may select a preference image based on preferences for the extracted images. In various embodiments, the processor 120 may estimate user's preferences for the extracted images. In various embodiments, the user's preferences for the extracted images may be data having values.

In various embodiments, the processor 120 may estimate user's preferences for the extracted images, based on information collected according to user inputs. In various embodiments, the processor 120 may estimate user's preferences for the extracted images, based on face tags tagged to the images. In various embodiments, referring to table 1, in the extracted images, there are four images in which the face tag "Eden" is set, three images in which the face tag "Mary" is set, one image in which the face tag "Wife" is set, three images in which the face tag "Lee Sin" is set, and three images in which the face tag "me" is set. Therefore, the processor 120 may estimate that the user's preference for the images in which the face tag "Eden" is set is highest from among the extracted images. In various embodiments, referring to table 1, the processor 120 may estimate that the user's preference is high in order of the images in which the face tag "Eden" is set, the images in which the face tag "Mary" is set, the images in which the face tag "Lee Sin" is set, the images in which the face tag "me" is set, and the images in which the face tag "Wife" is set. In various embodiments, referring to table 1, the processor 120 may estimate that the user's preference for the images in which the face tag "Mary" is set, the user's preference for the images in which the face tag "Lee Sin" is set, and the user's preference for the images in which the face tag "me" is set are the same.

In various embodiments, the processor 120 may estimate the user's preferences for the extracted images, based on image information of the extracted images.

In various embodiments, the processor 120 may estimate the user's preferences for the extracted images, based on the number of times of viewing of the extracted images. In various embodiments, referring to table 1, the processor 120 may estimate that the image (AA2.jpg) which is viewed a large number of times has the highest user preference. In various embodiments, referring to table 1, the processor 120 may estimate that the images (CC1.jpg, DD1.jpg) which are viewed a small number of times have the lowest user preference.

In various embodiments, the processor 120 may estimate the user's preferences for the extracted images, based on the number of times of sharing of the extracted images. In various embodiments, referring to table 1, the processor 120 may estimate that the images (AA1.jpg, AA3.jpg) which are shared a large number of times have the highest user preference. In various embodiments, referring to table 1, the processor 120 may estimate that the images (BB1.jpg, CC1.jpg, DD1.jpg, EE1.jpg, EE2.jpg) which are shared a small number of times have the lowest user preference.

In various embodiments, the processor 120 may estimate the user's preferences for the extracted images, based on place information of the images and the place wish list. In various embodiments, the processor 120 may estimate the user's preference for an image having place information included in the place wish list, from among the extracted images, to be high. In various embodiments, the processor 120 may estimate the user's preference for an image having place information that is not included in the place wish list, from among the extracted images, to be low. In various embodiments, when "A mall" and "C restaurant" are included in the place wish list, the processor 120 may estimate the user's preferences for images (AA1.jpg, AA2.jpg, AA3.jpg, AA4.Jpg, EE1.jpg, EE2.jpg, EE3.jpg) having place information included in the place wish list, from among the extracted images as shown in table 1, to be high. In various embodiments, when "A mall" and "C restaurant" are included in the place wish list, the processor 120 may estimate the user's preferences for images (AA5.jpg, BB1.jpg, CC1.jpg, DD1.jpg) having place information that is not included in the place wish list, from among the extracted images as shown in table 1, to be low.

In various embodiments, the processor 120 may estimate the user's preferences for the extracted images, based on story information of the images.

In various embodiments, referring to table 1, in the extracted images, there are five images in which the story type is set to "Baby," two images in which the story type is set to "Location," three images in which the story type is set to "Manual," and one image in which the story type is not set. Therefore, the processor 120 may estimate that the user's preference for the images in which the story type is set to "Baby" is highest from among the extracted images. In various embodiments, referring to table 1, the processor 120 may estimate that the user's preference is high in order of the images in which the story type is set to "Baby," the images in which the story type is set to "Manual," the images in which the story type is set to "Location," and the images in which the story type is not set.

In various embodiments, the processor 120 may select at least one image from among the extracted images in order of the estimated user's preference. In various embodiments, when there are two or more user preferences, the processor 120 may select at least one image based on a weighted average of the two or more preferences. In various embodiments, the processor 120 may select at least one image (for example, images AA1.jpg to AA5.jpg) from among the extracted images.

In various embodiments, the processor 120 may set a selection suspension period for the selected image. In various embodiments, the processor 120 may select at least one image in order of the user's estimated preference from a higher one from among the extracted images, but may not select an image corresponding to the selection suspension period even if the image has a high preference. In various embodiments, the selection suspension period may be a period from a time at which a set time is elapsed after a certain image is selected until a pre-set selection suspension cancel time. In various embodiments, images may be selected after the selection suspension cancel time.

In various embodiments, the processor 120 may select a pre-set number of images from among the extracted images, based on the estimated user's preference. In various embodiments, when images selected based on the estimated user's preference exceed the pre-set number, the processor 120 may select the pre-set number of images based on context information. In various embodiments, when the selected images exceed the pre-set number, the processor 120 may select the pre-set number of images in order of the most recent date. In various embodiments, when the selected images exceed the pre-set number, the processor 120 may select the pre-set number of images by selecting an image shot on an anniversary in preference to the other images. In various embodiments, the anniversary may include a public holiday such as Christmas, Chuseok (Korean Thanksgiving Day), Korean New Year's Day, and a personal anniversary such as a birthday, a wedding anniversary set in a user's planner. In various embodiments, the most recent date, the anniversary, or a combination thereof may be included in the context information.

In various embodiments, in operation 440, the processor 120 may display an image corresponding to the selected preference image by overlaying the same on the preview image. In various embodiments, the image corresponding to the selected preference image may be a thumbnail. In various embodiments, the image corresponding to the selected preference image may be an image indicating an object included in the preference image.

Figure 5:
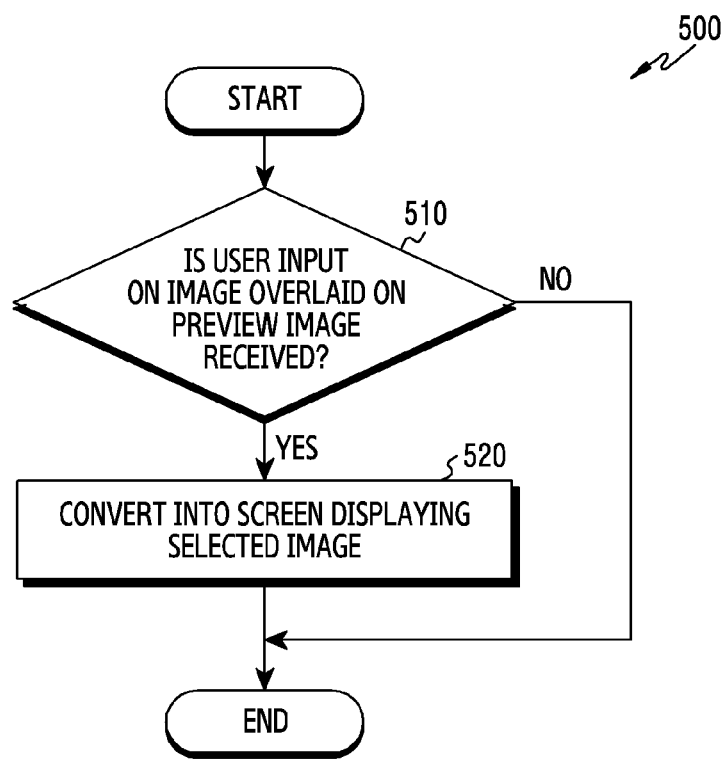
FIG. 5 is a flowchart illustrating a process according to an input on an image overlaid on a preview image of an electronic device according to various embodiments.
Figure 6:
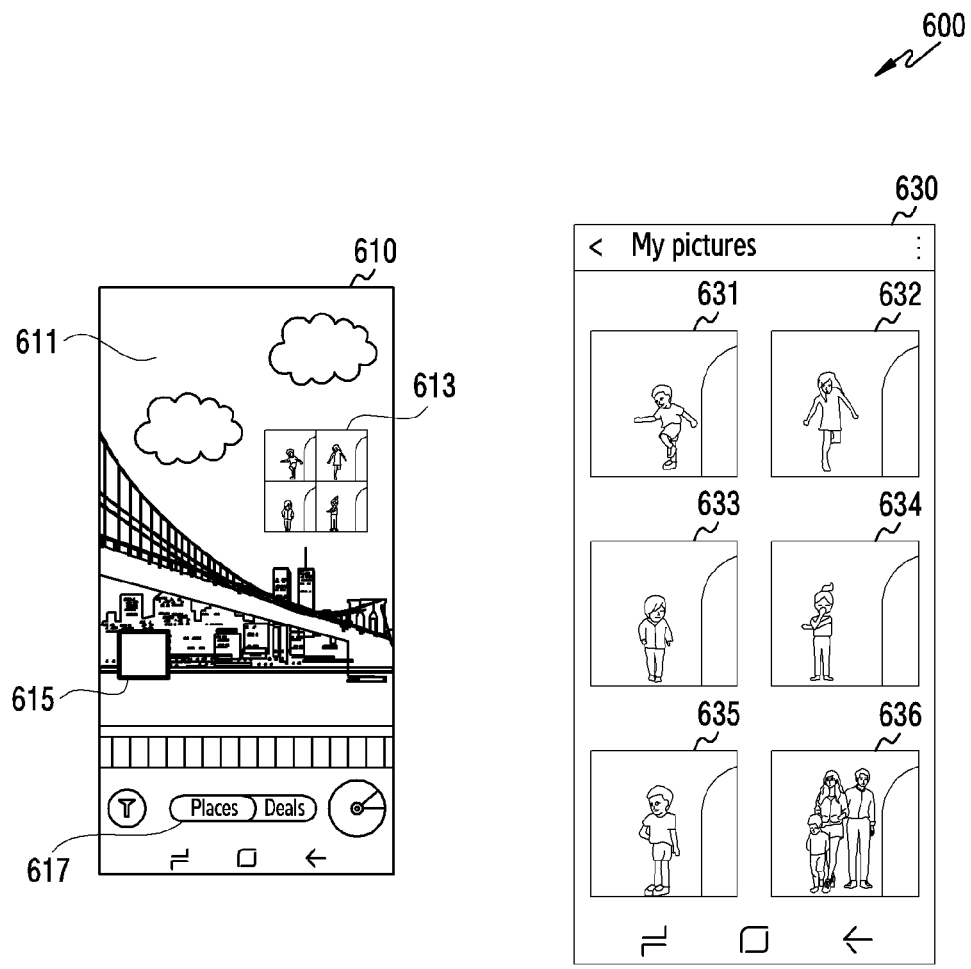
FIG. 6 is a view illustrating an example of a process according to an input on an image overlaid on a preview image of an electronic device according to various embodiments.

FIG. 5 is a flowchart 500 illustrating a process according to an input on an image overlaid on a preview image of an electronic device (for example, the electronic device 101 of FIG. 1) according to various embodiments. FIG. 6 is a view illustrating an example 600 of a process according to an input on an image overlaid on a preview image of an electronic device (for example, the electronic device 101 of FIG. 1). FIGS. 5 and 6 will be described with reference to the functional configuration of FIG. 3 or the configuration of the electronic device 101 of FIG. 1.

Referring to FIG. 5, in various embodiments, a processor (for example, the processor 120 of FIG. 1) may identify whether there is a user input on an image overlaid on a preview image in operation 510. In various embodiments, the user input may be a touch input on the overlaid image. In various embodiments, the overlaid image may be an image (for example, a thumbnail) corresponding to a selected preference image. In various embodiments, the selected preference image may be the image selected in operation 430 of FIG. 4.

Referring to FIG. 6, in various embodiments, the processor 120 may obtain a preview image 611 of FIG. 6 by executing an application for driving a camera module (for example, the camera module 180 of FIG. 1). In various embodiments, the processor 120 may display the preview image 611 which is obtained through a user interface provided by the application on the display device 160. In various embodiments, the processor 120 may generate an image 613 to be overlaid on the preview image 611 of FIG. 6, and an object 615 (for example, an image object, a text object) to be overlaid on the preview image 611, in response to a user input on an executable object 617 of the user interface provided by the application. In various embodiments, the processor 120 may generate a screen 610 in which the image 613 and the object 615 are overlaid on the preview image 611, and may display the screen 610 on a display device (for example, the display device 160 of FIG. 1). In various embodiments, the processor 120 may identify a user input of selecting the image 613 overlaid on the preview image 611. In various embodiments, the overlaid image 613 may include images (for example, thumbnails) corresponding to selected preference images.

In various embodiments, when the application for driving the camera module (for example, the camera module 180 of FIG. 1) is executed, the processor 120 may perform the operations shown in FIG. 4. In various embodiments, the processor 120 may perform the operations shown in FIG. 4 in response to a user input on the executable object 617 of the user interface provided by the application after the application for driving the camera module (for example, the camera module 180 of FIG. 1) is executed.

In various embodiments, when a user input on the image overlaid on the preview image is identified ("Yes"), the processor 120 may perform operation 520. In various embodiments, when the user input on the image overlaid on the preview image is not identified ("No"), the processor 120 may finish the process.

In various embodiments, in operation 520, the processor 120 may convert into a screen displaying the selected preference image. In various embodiments, the selected preference image may be the image which is selected in operation 430 of FIG. 4.

Referring to FIG. 6, when the user input on the image 613 overlaid on the preview image 611 is identified, the processor 120 may convert from the screen 610 into a screen 630 according to a user interface which provides a function of viewing the selected preference images 631 to 636 of the application.

In various embodiments, the processor 120 may identify at least one other image shot out of a region of a set range from a location of the electronic device 102 from among the plurality of images, based on location information of the plurality of images, and may display the identified at least one other image on the display device 160 by overlaying the same on the preview image along with the thumbnail image corresponding to the preference image.

Figure 7:
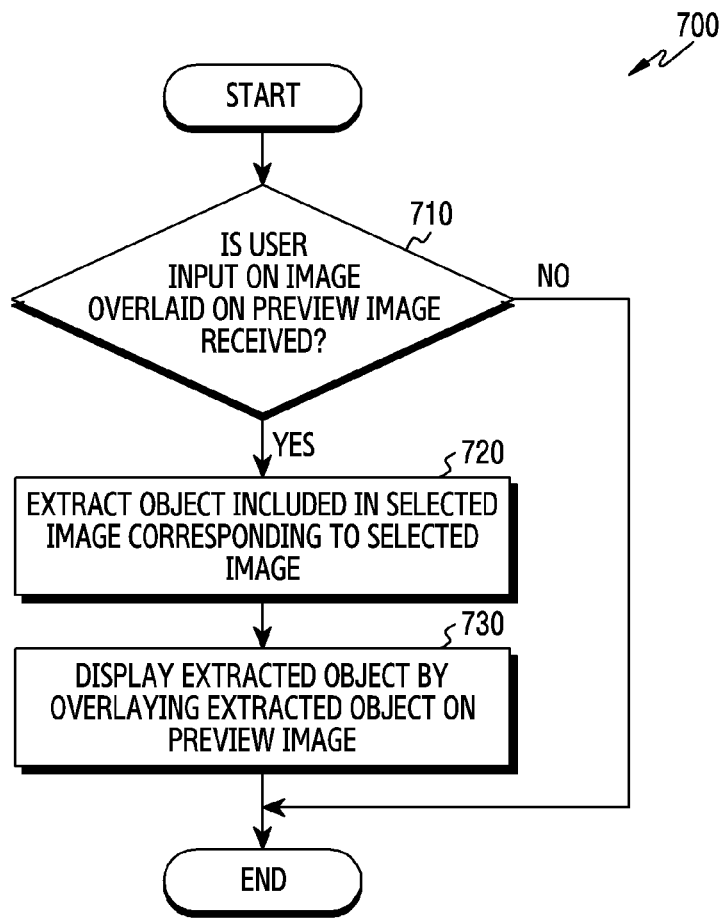
FIG. 7 is a flowchart illustrating a process according to an input on an image overlaid on a preview image of an electronic device according to various embodiments.
Figure 8:
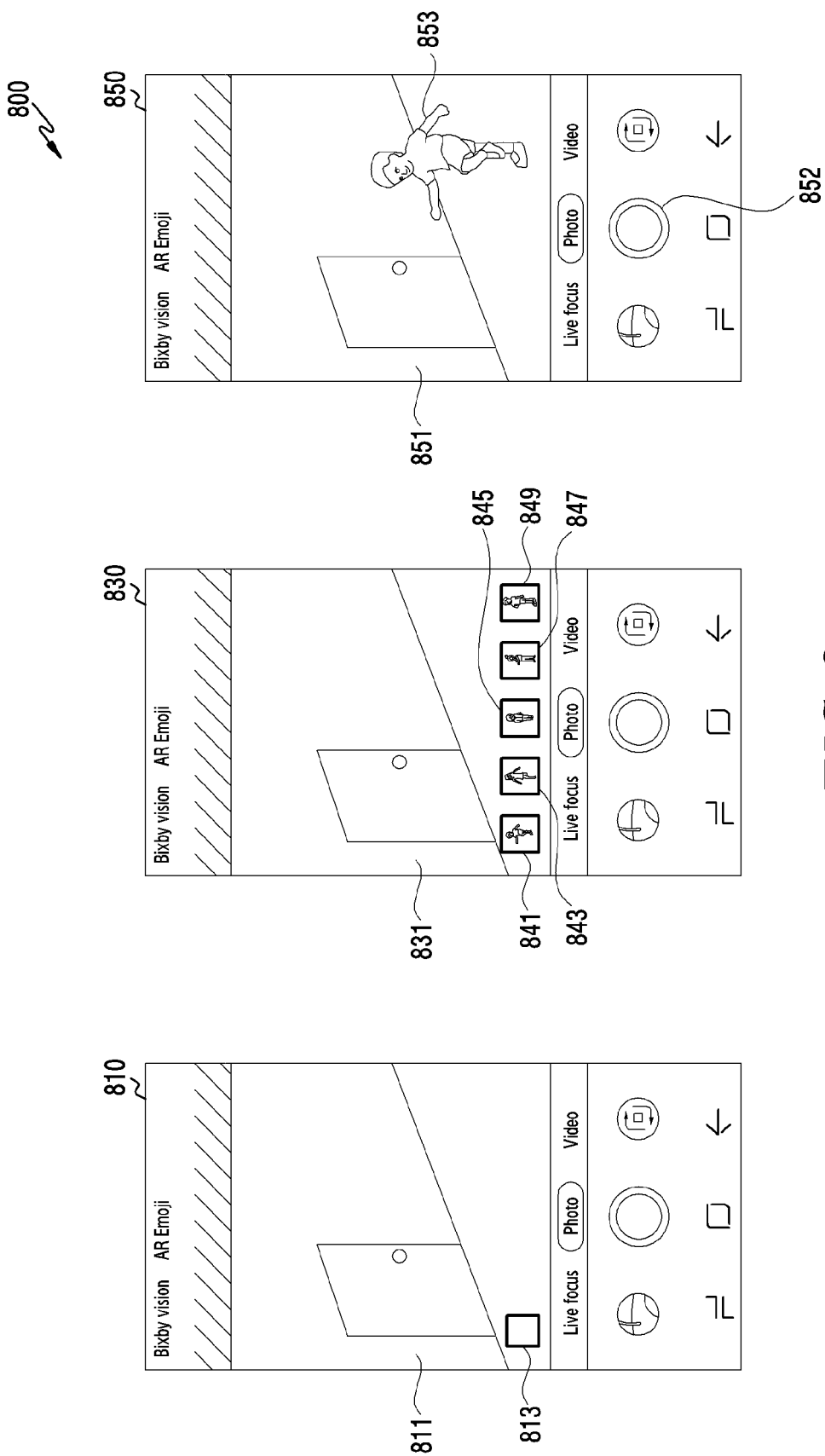
FIG. 8 is a view illustrating an example of a process according to an input on an image overlaid on a preview image of an electronic device according to various embodiments.

FIG. 7 is a flowchart 700 illustrating a process according to an input on an image overlaid on a preview image of an electronic device (for example, the electronic device 101 of FIG. 1) according to various embodiments. FIG. 8 is a view illustrating an example 800 of a process according to an input on an image overlaid on a preview image of an electronic device (for example, the electronic device 101 of FIG. 1) according to various embodiments. FIGS. 7 and 8 will be described with reference to the functional configuration of FIG. 3, or the configuration of the electronic device 101 of FIG. 1.

Referring to FIG. 7, in various embodiments, in operation 701, a processor (for example, the processor 120 of FIG. 1) may identify whether there is a user input on an image overlaid on a preview image. In various embodiments, the user input may be a touch input on the overlaid image. In various embodiments, the overlaid image may be an image (for example, a thumbnail) corresponding to a selected preference image. In various embodiments, the selected preference image may be the image which is selected in operation 403 of FIG. 4.

Referring to FIG. 8, in various embodiments, the processor 120 may obtain a preview image 811 of FIG. 8 by executing an application for driving a camera module (for example, the camera module 180 of FIG. 1). In various embodiments, the processor 120 may display the preview image 811 obtained through a user interface provided by the application on the display device 160. In various embodiments, the processor 120 may generate images 841 to 849 to be overlaid on the preview image 811 of FIG. 8, in response to a user input on an executable object 813 of the user interface provided by the application. In various embodiments, the processor 120 may generate a screen 830 in which the images 841 to 849 to be overlaid are overlaid on a preview image 831, and may display the screen 830 on the display device (for example, the display device 160 of FIG. 1). In various embodiments, the processor 120 may identify a user input of selecting at least one image (for example, the image 841) from among the images 841 to 849 overlaid on the preview image 831. In various embodiments, the images 841 to 849 to be overlaid may be images (for example, thumbnails) corresponding to the selected preference images.

In various embodiments, when the application for driving the camera module (for example, the camera module 180 of FIG. 1) is executed, the processor 120 may perform the operations shown in FIG. 4. In various embodiments, the processor 120 may perform the operations shown in FIG. 4 in response to a user input on the executable object 813 of the user interface provided by the application after the application for driving the camera module (for example, the camera module 180 of FIG. 1) is executed.

In various embodiments, when a user input on the image overlaid on the preview image is identified ("Yes"), the processor 120 may perform operation 720. In various embodiments, when the user input on the image overlaid on the preview image is not identified ("No"), the processor 120 may finish the process.

In various embodiments, in operation 720, the processor 120 may extract an object included in a selected image corresponding to the selected image. In various embodiments, in response to a user input of selecting the image 841 from among the images 841 to 849 overlaid on the preview image 831, the processor 120 may extract an object included in a selected preference image corresponding to the image 841 (for example, the preference image 631 corresponding to the image 841 from among the preference images 631 to 636 of FIG. 6).

In various embodiments, in operation 730, the processor 120 may display the extracted object by overlaying the object on the preview image.

In various embodiments, the processor 120 may extract an object 853 included in the selected preference image 631 corresponding to the user input. In various embodiments, the processor 120 may generate a screen 850 in which the extracted object 853 is overlaid on a preview image 851, and may display the screen 850 on the display device 160. In various embodiments, the processor 120 may obtain an image in which the extracted object 853 is overlaid on the preview image 851 based on a user input on an executable object 852 provided by the user interface of the application.

In various embodiments, the processor 120 may display the object included in the preference image on the display device 160 by overlaying the object to be adjacent to an object having the same type from among objects included in the preview image which is obtained through the camera module 180, according to the type of the object (for example, at least one of a person, a building, or a thing) included in the preference image. In various embodiments, the processor 120 may determine whether the object included in the preference image 631 indicates a person. In various embodiments, when the object included in the preference image 631 indicates a person, the processor 120 may identify an object indicating a person from among objects included in the preview image obtained through the camera module 180. In various embodiments, the processor 120 may display the person object included in the preference image 631 on the display device 160 by overlaying the person object to be adjacent to the object indicating the person, which is included in the preview image, while displaying the preview image obtained through the camera module 180 on the display device 160.

Figure 9:
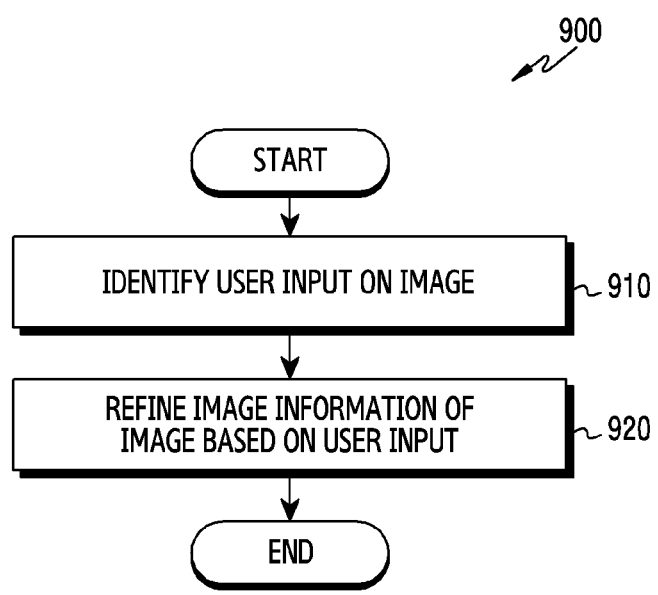
FIG. 9 is a flowchart for refining image information of an image in an electronic device according to various embodiments.

FIG. 9 is a flowchart for refining image information of an image in an electronic device (for example, the electronic device 101 of FIG. 1) according to various embodiments. FIG. 9 will be described with reference to the functional configuration of FIG. 3 or the configuration of the electronic device 101 of FIG. 1.

Referring to FIG. 9, in various embodiments, a processor (for example, the processor 120 of FIG. 1) may identify a user input on an imagen in operation 910. In various embodiments, the user input on the image may include an input for viewing (or displaying) an image through an application, an input for sharing an image with another electronic device (for example, the electronic device 102), an input for tagging certain information to an objected included in the image, or a combination thereof.

In various embodiments, in operation 920, the processor 120 may refine image information of the image based on a user input. In various embodiments, the processor 120 may refine a viewing time of the image, the number of times of viewing, the number of times of sharing, tag information, or a combination thereof, based on the user input.

The electronic device and the method thereof according to various embodiments may select information desired by a user and may overlay the information on a preview image. The electronic device and the method thereof according to various embodiments may select information desired by a user and overlay the information on a preview image, such that availability of an AR service of the user can be enhanced.

An electronic device according to various embodiments may include a camera, a memory, a display, and a processor, and the processor may be configured to: when an input for executing a camera application is received, identify first images which are shot within a region of a set range from a location of the electronic device from among a plurality of images, based on location information of the plurality of images stored in the memory or an external electronic device; select at least one second image from the first images, based on a priority of each of the first images; and, while displaying a preview image obtained through the camera on the display, display a visual object including a thumbnail image corresponding to the at least one second image on the display by overlaying the visual object on the preview image.

In various embodiments, the processor may be configured to: identify the priority of each of the first images, based on image information of each of the first images; and select the at least one second image, based on the priority of each of the first images.

In various embodiments, the processor may be configured to identify that a priority of at least one image in which place information included in the image information is included in a place wish list of a user of the electronic device from among the first images is higher than priorities of other images in which the place information included in the image information is not included in the place wish list of the user.

In various embodiments, the processor may be configured to: identify face tag information included in the image information of each of the first images; identify the number of face tags for each person set for the first images, based on the identified face tag information; and identify that a priority of an image including a face tag of a person who is most identified from among the persons is higher than priorities of images including face tags regarding other persons.

In various embodiments, the processor may be configured to: identify story type information included in the image information of each of the first images; identify a number of story types set for the first images, based on the identified story type information; and identify that a priority of an image set to have a story type that is most identified from among the story types is higher than priorities of images set to have other story types.

In various embodiments, the processor may be configured to: identify a number of times of viewing of the image included in the image information of each of the first images; and identify that a priority of an image which is viewed a large number of times is higher than a priority of an image which is viewed a small number of times.

In various embodiments, the processor may be configured to: receive a user input on the visual object; extract an object included in the at least one second image in response to the user input; and while displaying the preview image obtained through the camera on the display, display the object on the display by overlaying the object on the preview image.

In various embodiments, the processor may be configured to: when the object included in the at least one second object indicates a person, identify an object indicating a person from among objects included in the preview image obtained through the camera; and, while displaying the preview image obtained through the camera on the display, display the object included in the at least one second image on the display by overlaying the object to be adjacent to the object indicating the person included in the preview image.

In various embodiments, the processor may be configured to: receive a user input on the visual object; in response to the user input, generate a screen for displaying the at least one second image; and display the generated screen on the display.

In various embodiments, the processor may be configured to identify at least one other image shot out of a region of a set range from a location of the electronic device from among the plurality of images, based on location information of the plurality of images stored in the memory or the external electronic device, and, while displaying the preview image obtained through the camera on the display, to display another visual object including the thumbnail image corresponding to the at least one second image and other thumbnail images corresponding to the at least one other image on the display by overlaying another visual object on the preview image.

In various embodiments, the processor may be configured to: identify face tag information included in the image information of each of the first images; identify a graph indicating a relationship of persons based on the identified face tag information; identify the number of face tags for each person set for the first images, based on face tag information regarding a person indicated by a center node of the graph; and identify that a priority of an image including a face tag of a person who is most identified from among the persons is higher than priorities of images including face tags regarding other persons.

In various embodiments, the processor may be configured to: when the number of the at least one second image exceeds a pre-set number, select a number of third images smaller than or equal to the pre-set number from among the at least one second image, based on context information; and, while displaying the preview image obtained through the camera on the display, display a visual object including a thumbnail image corresponding the number of third images smaller than or equal to the pre-set number on the display by overlaying the visual object on the preview image.

An operating method of an electronic device according to various embodiments may include: when an input for executing a camera application is received, identifying first images which are shot within a region of a set range from a location of the electronic device from among a plurality of images, based on location information of the plurality of images stored in a memory of the electronic device or an external electronic device, selecting at least one second image from the first images, based on a priority of each of the first images; and, while displaying a preview image obtained through a camera of the electronic device on a display of the electronic device, displaying a visual object including a thumbnail image corresponding to the at least one second image on the display by overlaying the visual object on the preview image.

In various embodiments, selecting the at least one second image may further include: identifying the priority of each of the first images, based on image information of each of the first images; and selecting the at least one second image, based on the priority of each of the first images.

In various embodiments, identifying the priority may include identifying that a priority of at least one image in which place information included in the image information is included in a place wish list of a user of the electronic device from among the first images is higher than priorities of other images in which the place information included in the image information is not included in the place wish list of the user.

In various embodiments, identifying the priority may include: identifying face tag information included in the image information of each of the first images; identifying the number of face tags for each person set for the first images, based on the identified face tag information; and identifying that a priority of an image including a face tag of a person who is most identified from among the persons is higher than priorities of images including face tags regarding other persons.

In various embodiments, identifying the priority may include: identifying story type information included in the image information of each of the first images; identifying a number of story types set for the first images, based on the identified story type information; and identifying that a priority of an image set to have a story type that is most identified from among the story types is higher than priorities of images set to have other story types.

In various embodiments, identifying the priority may include: identifying a number of times of viewing of the image included in the image information of each of the first images; and identifying that a priority of an image which is viewed a large number of times is higher than a priority of an image which is viewed a small number of times.

In various embodiments, the method may further include: receiving a user input on the visual object; extracting an object included in the at least one second image in response to the user input; and, while displaying the preview image obtained through the camera on the display, displaying the object on the display by overlaying the object on the preview image.

In various embodiments, the method may further include: when the object included in the at least one second object indicates a person, identifying an object indicating a person from among objects included in the preview image obtained through the camera; and, while displaying the preview image obtained through the camera on the display, displaying the object included in the at least one second image on the display by overlaying the object to be adjacent to the object indicating the person included in the preview image.

In various embodiments, the method may further include: receiving a user input on the visual object; in response to the user input, generating a screen for displaying the at least one second image; and displaying the generated screen on the display.

In various embodiments, the method may further include: identifying at least one other image shot out of a region of a set range from a location of the electronic device from among the plurality of images, based on location information of the plurality of images stored in the memory or the external electronic device; and, while displaying the preview image obtained through the camera on the display, displaying another visual object including the thumbnail image not corresponding to the at least one second image and other thumbnail images corresponding to the at least one other image on the display by overlaying another visual object on the preview image.

In various embodiments, identifying the priority may include: identifying face tag information included in the image information of each of the first images; identifying a graph indicating a relationship of persons based on the identified face tag information; and identifying that a priority of an image including face tag information regarding a person indicated by a center node of the graph is higher than priorities of images including face tags regarding other persons.

In various embodiments, the method may further include: when the number of the at least one second image exceeds a pre-set number, selecting a number of third images smaller than or equal to the pre-set number from among the at least one second image, based on context information; and, while displaying the preview image obtained through the camera on the display, displaying a visual object including a thumbnail image corresponding the number of third images smaller than or equal to the pre-set number on the display by overlaying the visual object on the preview image.

The effects achieved by the disclosure are not limited to those mentioned above, and other effects that are not mentioned above may be clearly understood to those skilled in the art based on the description provided above.

Methods according to various example embodiments of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and various example embodiments of the present disclosure are not limited to a single element or multiple elements thereof. Further, either multiple elements expressed in the description may be configured into a single element or a single element in the description may be configured into multiple elements.

While the present disclosure has been illustrated and described with reference to various example embodiments thereof, it will be understood by those skilled in the art that various changes in form and details may be made therein without departing from the true spirit and full scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a camera;
a memory;
a display; and
a processor,
wherein the processor is configured to:
based on an input for executing a camera application being received, identify first images shot within a region of a set range from a location of the electronic device from among a plurality of images based on location information of the plurality of images stored in the memory or an external electronic device;
calculate a preference value respectively corresponding to the first images;
estimate, based on the preference value, a user's preferences for the first images, respectively;
select at least one second image from the first images based on a priority of each of the first images determined by the user's preferences; and
while displaying a preview image obtained through the camera on the display, display a visual object comprising a thumbnail image corresponding to the at least one second image on the display by overlaying the visual object on the preview image.

2. The electronic device of claim 1, wherein the processor is further configured to:
identify the priority of each of the first images based on image information of each of the first images; and
select the at least one second image based on the priority of each of the first images.

3. The electronic device of claim 2, wherein the processor is further configured to identify that a priority of at least one image in which place information included in the image information is included in a place wish list of a user of the electronic device from among the first images is higher than priorities of other images in which the place information included in the image information is not included in the place wish list of the user.

4. The electronic device of claim 2, wherein the processor is further configured to:
identify face tag information included in the image information of each of the first images;
identify a graph indicating a relationship of persons based on the identified face tag information; and
identify that a priority of an image comprising face tag information regarding a person indicated by a center node of the graph is higher than priorities of images comprising face tag information regarding other persons.

5. The electronic device of claim 2, wherein the processor is further configured to:
identify story type information included in the image information of each of the first images;
identify a number of story types set for the first images based on the identified story type information; and
identify that a priority of an image set to have a story type that is most identified from among the story types is higher than priorities of images set to have other story types.

6. The electronic device of claim 2, wherein the processor is further configured to:
identify a number of times of viewing of an image included in the image information of each of the first images; and
identify that a priority of the image that is viewed a larger number of times than another image is higher than a priority of the other image.

7. The electronic device of claim 2, wherein the processor is further configured to:
based on a number of the at least one second image exceeding a pre-set number, select a number of third images smaller than or equal to the pre-set number from among the at least one second image based on context information; and
while displaying the preview image obtained through the camera on the display, display a visual object comprising a thumbnail image corresponding to the number of third images smaller than or equal to the pre-set number on the display by overlaying the visual object on the preview image.

8. The electronic device of claim 1, wherein the processor is further configured to:
receive a user input on the visual object;
extract an object included in the at least one second image in response to the user input; and
while displaying the preview image obtained through the camera on the display, display the object on the display by overlaying the object on the preview image.

9. The electronic device of claim 8, wherein the processor is further configured to:
based on the object included in the at least one second image indicating a person, identify an object indicating a person from among objects included in the preview image obtained through the camera; and
while displaying the preview image obtained through the camera on the display, display the object included in the at least one second image on the display by overlaying the object to be adjacent to the object indicating the person included in the preview image.

10. The electronic device of claim 1, wherein the processor is further configured to:
receive a user input on the visual object;
in response to the user input, generate a screen for displaying the at least one second image; and
display the generated screen on the display.

11. An operating method of an electronic device, the method comprising:
based on an input for executing a camera application being received, identifying first images shot within a region of a set range from a location of the electronic device from among a plurality of images based on location information of the plurality of images stored in a memory of the electronic device or an external electronic device;
calculating a preference value respectively corresponding to the first images;
estimating, based on a preference value, a user's preferences for the first images, respectively;
selecting at least one second image from the first images based on a priority of each of the first images determined by the user's preferences; and
while displaying a preview image obtained through a camera of the electronic device on a display of the electronic device, displaying a visual object comprising a thumbnail image corresponding to the at least one second image on the display by overlaying the visual object on the preview image.

12. The method of claim 11, wherein selecting the at least one second image further comprises:
identifying the priority of each of the first images based on image information of each of the first images; and selecting the at least one second image based on the priority of each of the first images.

13. The method of claim 12, wherein identifying the priority further comprises identifying that a priority of at least one image in which place information included in the image information is included in a place wish list of a user of the electronic device from among the first images is higher than priorities of other images in which the place information included in the image information is not included in the place wish list of the user.

14. The method of claim 12, wherein identifying the priority further comprises:
    identifying face tag information included in the image information of each of the first images;
    identifying a graph indicating a relationship of persons based on the identified face tag information; and
    identifying that a priority of an image comprising face tag information regarding a person indicated by a center node of the graph is higher than priorities of images comprising face tag information regarding other persons.

15. The method of claim 12, wherein identifying the priority further comprises:
    identifying story type information included in the image information of each of the first images;
    identifying a number of story types set for the first images based on the identified story type information; and
    identifying that a priority of an image set to have a story type that is most identified from among the story types is higher than priorities of images set to have other story types.

16. The method of claim 12, wherein identifying the priority further comprises:
    identifying a number of times of viewing of an image included in the image information of each of the first images; and
    identifying that a priority of an image that is viewed a larger number of times than another image is higher than a priority of the other image.

17. The method of claim 12, further comprising:
    based on a number of the at least one second image exceeding a pre-set number, selecting a number of third images smaller than or equal to the pre-set number from among the at least one second image, based on context information; and
    while displaying the preview image obtained through the camera on the display, displaying a visual object comprising a thumbnail image corresponding to the number of third images smaller than or equal to the pre-set number on the display by overlaying the visual object on the preview image.

18. The method of claim 11, further comprising:
    receiving a user input on the visual object;
    extracting an object included in the at least one second image in response to the user input; and
    while displaying the preview image obtained through the camera on the display, displaying the object on the display by overlaying the object on the preview image.

19. The method of claim 18, further comprising:
    based on the object included in the at least one second image indicating a person, identifying an object indicating a person from among objects included in the preview image obtained through the camera; and
    while displaying the preview image obtained through the camera on the display, displaying the object included in the at least one second image on the display by overlaying the object to be adjacent to the object indicating the person included in the preview image.

20. The method of claim 11, further comprising:
    receiving a user input on the visual object;
    in response to the user input, generating a screen for displaying the at least one second image; and
    displaying the generated screen on the display.

* * * * *